United States Patent [19]
Hoch et al.

[11] 3,721,314
[45] March 20, 1973

[54] SILENCER OR MUFFLER FOR THE COMPOSITE NOZZLE OF AN AIRCRAFT JET ENGINE

[75] Inventors: Rene Gerard Hoch, 77-Dammarie-les-Lys; Louis Francois Jumelle, 91-Ris-Orangis, both of France

[73] Assignee: Societe Nationale d'Etude et de Construction de Moteurs d'Aviation, Paris, France

[22] Filed: Jan. 19, 1972

[21] Appl. No.: 219,108

[30] Foreign Application Priority Data

Jan. 20, 1971 France..................................7101797

[52] U.S. Cl. ......181/33 HC, 181/33 HD, 239/265.13
[51] Int. Cl. .............................B64d 33/06, F01n 1/14
[58] Field of Search ........181/33 HB, 33 HC, 33 HD; 239/127.1, 127.3, 265.13, 265.17, 265.25, 265.31, 265.37

[56] References Cited

UNITED STATES PATENTS

| | | | |
|---|---|---|---|
| 2,997,845 | 8/1961 | Oulianoff | 181/33 HD UX |
| 3,061,038 | 10/1962 | Lawler et al. | 181/33 HC UX |
| 3,347,466 | 10/1967 | Nichols | 181/33 HC UX |
| 3,524,588 | 8/1970 | Duval | 181/33 HC X |
| 3,543,877 | 12/1970 | Ranvier et al. | 239/265.13 X |
| 3,612,209 | 10/1971 | Vdoviak | 181/33 HC |

FOREIGN PATENTS OR APPLICATIONS

| | | | |
|---|---|---|---|
| 1,193,372 | 5/1970 | Great Britain | 181/33 HC |
| 1,202,323 | 8/1970 | Great Britain | 181/33 HC |

*Primary Examiner*—Richard B. Wilkinson
*Assistant Examiner*—John F. Gonzales
*Attorney*—William J. Daniel

[57] ABSTRACT

A silencer or muffler device for a jet engine nozzle efflux system, of the type which includes a primary nozzle which emits into the divergent section of a secondary nozzle, formed by the inner wall of an afterbody with a streamlined outer wall, a primary jet of hot gases surrounded by a flow of secondary air; said device comprising a plurality of scoop-like members adapted to be moved between an active position in which they penetrate into the jet, as regards their upstream end, in the manner of scoops so as to bleed off portions of the jet of hot gases and of the flow of secondary air and discharge them in to the ambient atmosphere upstream of the exit of the divergent section by way of openings in the afterbody, so forming fractional jets around the central jet which is formed by the non-bled portion of the primary jet and of the secondary flow, and an inactive position in which they fit into the said openings and reconstitute the continuity of the wall of the divergent section.

10 Claims, 13 Drawing Figures

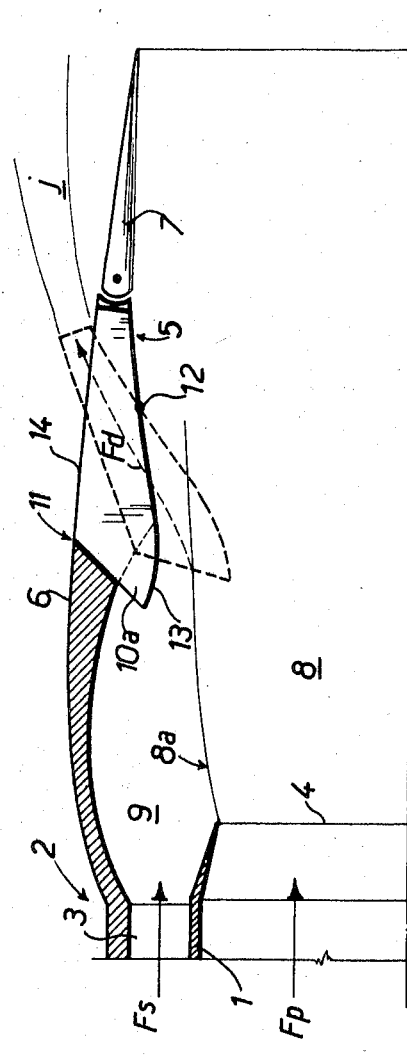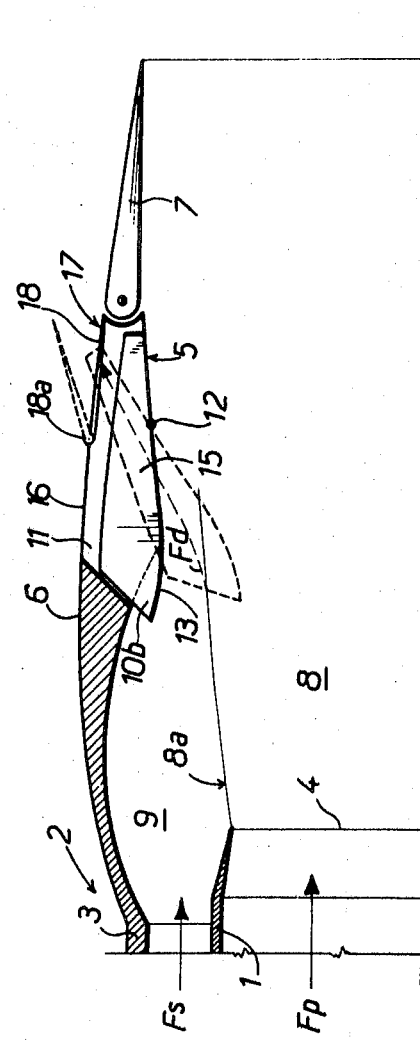
FIG. 1
FIG. 2

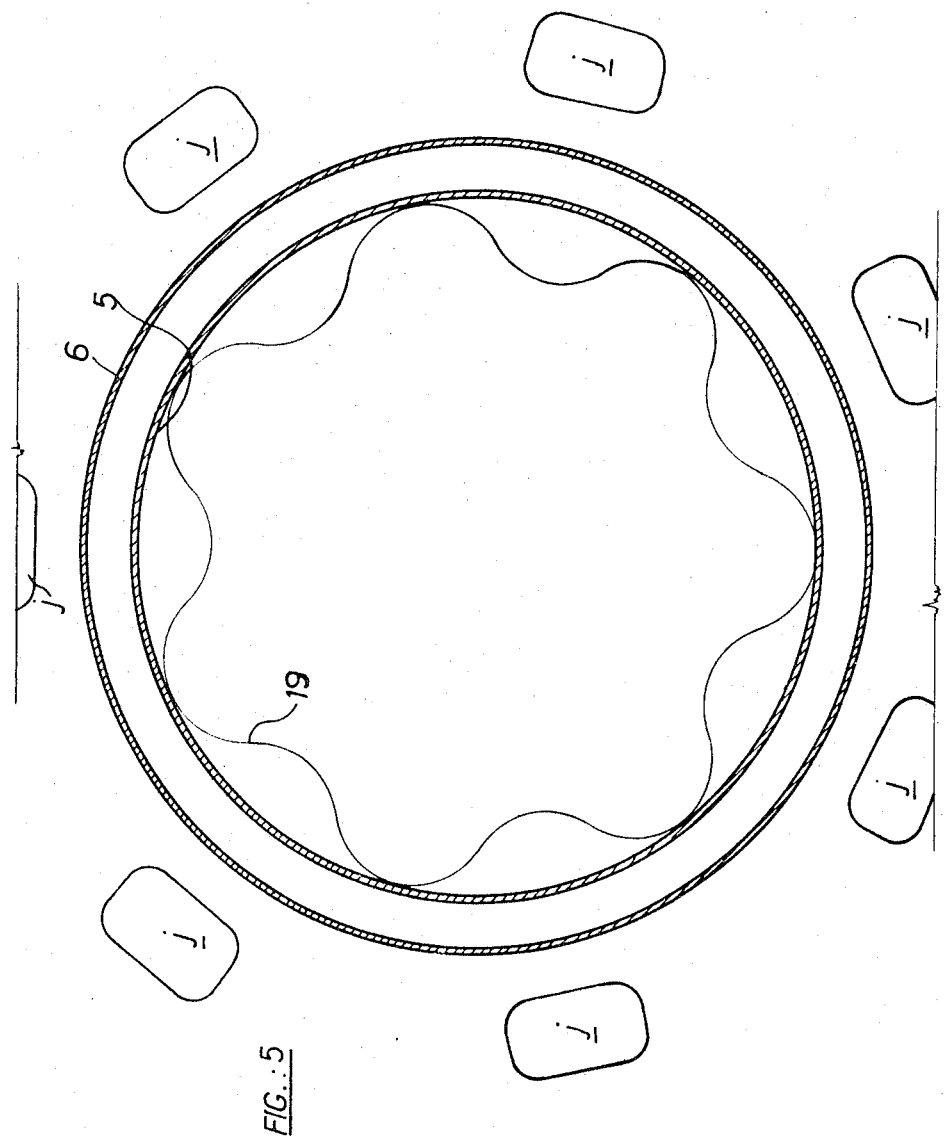

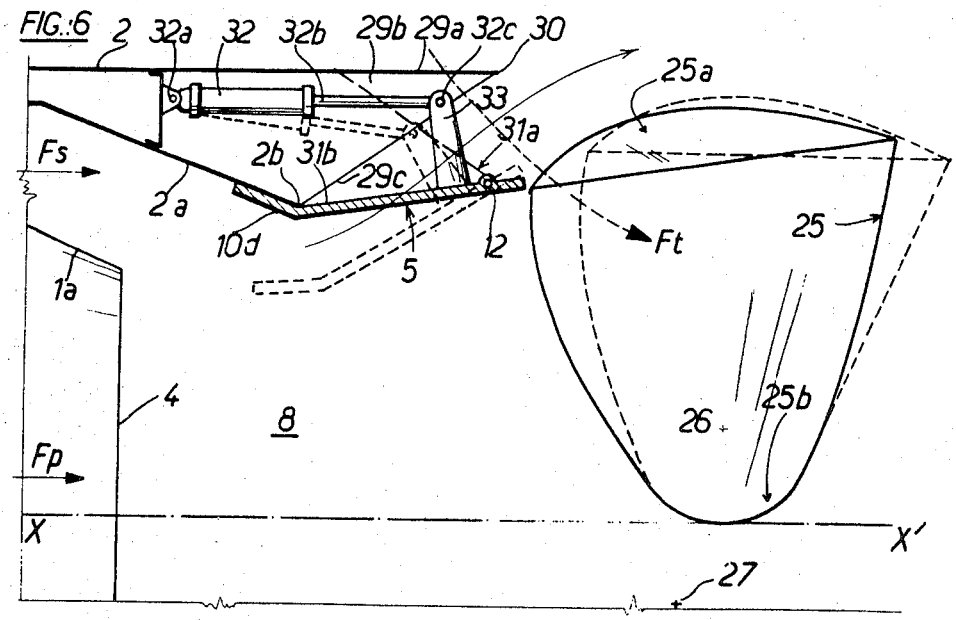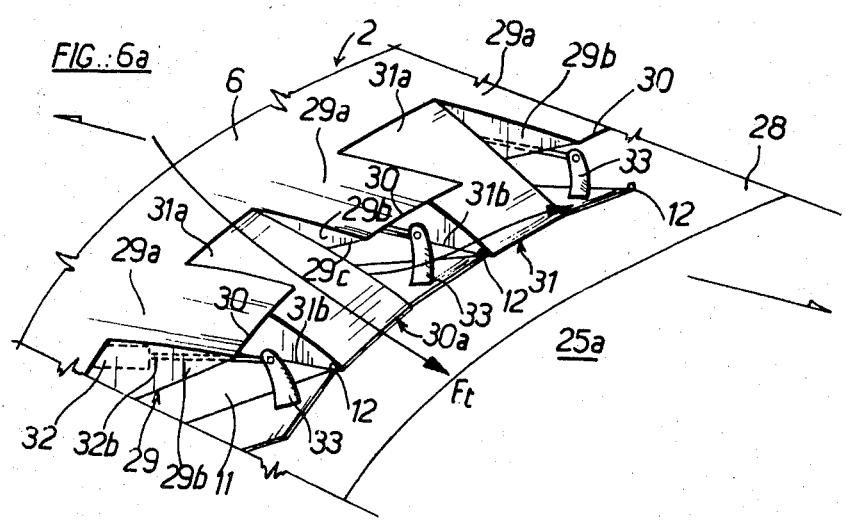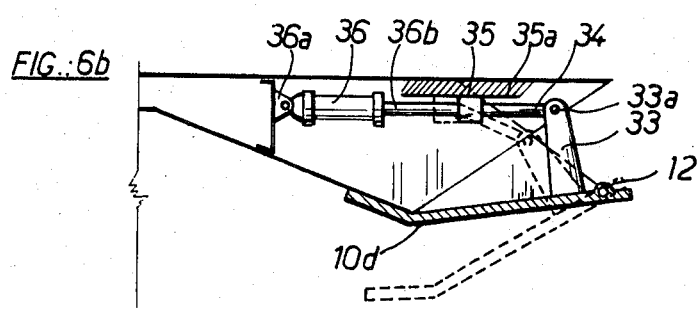

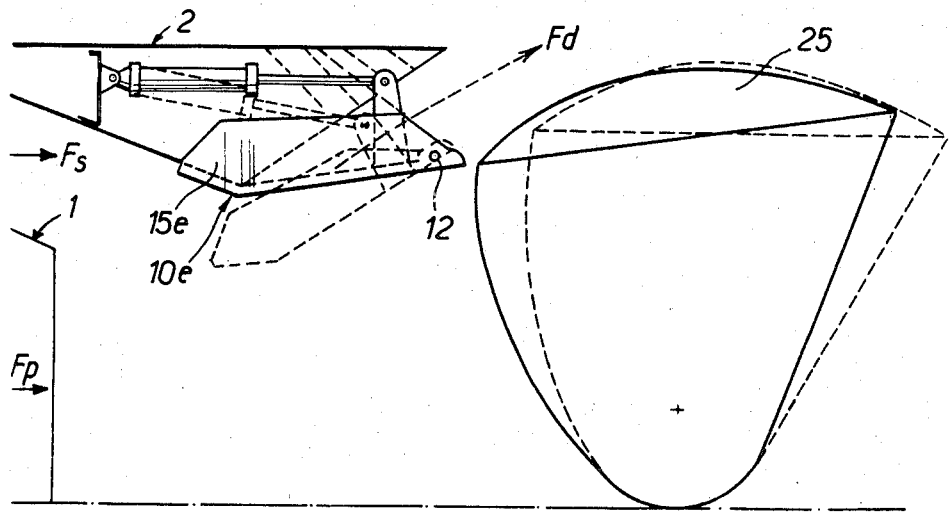
FIG.:7
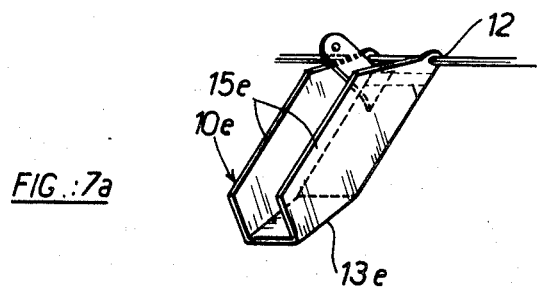
FIG.:7a
FIG.:8
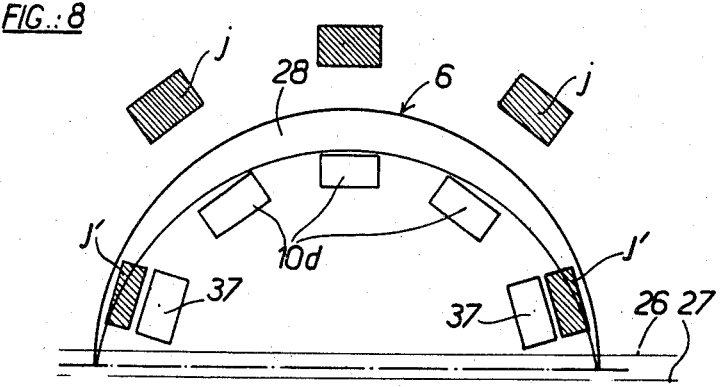

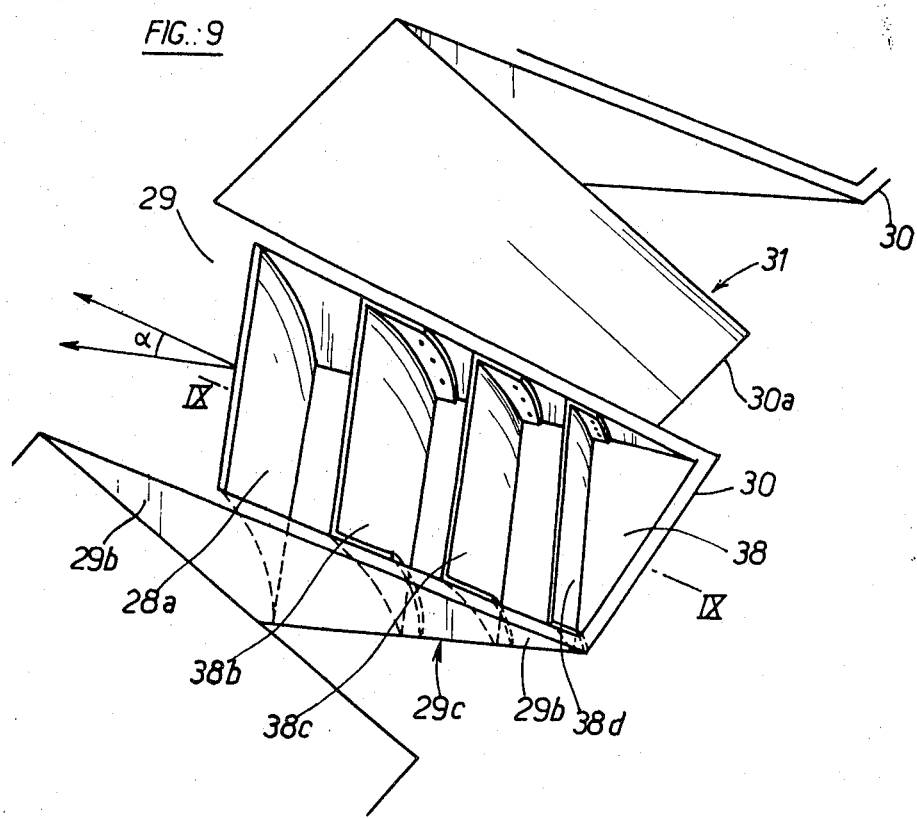
FIG.: 9
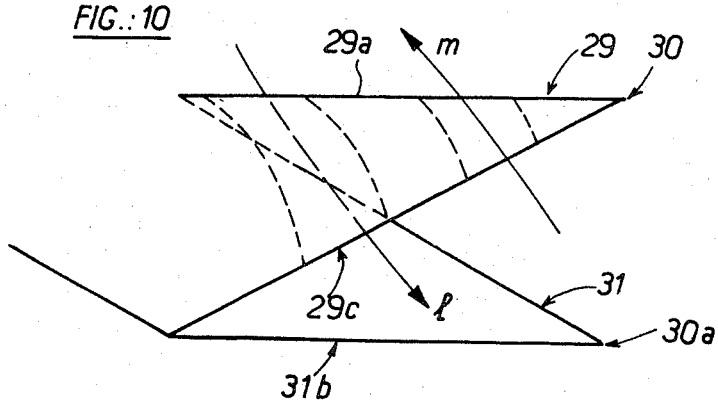
FIG.: 10

SILENCER OR MUFFLER FOR THE COMPOSITE NOZZLE OF AN AIRCRAFT JET ENGINE

The invention relates to a silencer or muffler device for a composite nozzle and more especially for an aircraft propulsive nozzle. By the expression "composite nozzle" there is to be understood an efflux system, more especially for a jet-engine providing the propulsion, this system comprising a primary nozzle which ejects into the divergent section of a secondary nozzle formed by the inner wall of an afterbody with a streamlined outer wall a primary jet of hot gases surrounded by a flow of secondary air. The primary nozzle is ordinarily surrounded by a fairing which along with the primary nozzle delimits an annular space and which extends downstream of the orifice of the primary nozzle, so forming the afterbody. In operation, the primary nozzle is fed with hot gases and the annular space is traversed by an air stream which forms in the secondary nozzle the secondary airflow that encloses the jet of hot gases exiting from the primary nozzle.

It is a known technique to attenuate the noise produced by the jet emitted by a single nozzle (i.e. one consisting solely of a primary nozzle) by means of members such as blades or ducts with a cylindrical or prismatic aspect, or ones having elbows (hereinafter these members will be called "scoops"), the upstream edge of which is caused to penetrate into the jet so as to bleed off, in the immediate vicinity of the nozzle orifice, a specified amount of gas and to deflect it, with a radial component, to the outside, into the air of the ambient atmosphere. By this means an acceleration in the mixing of the gases with the air will be achieved, something which produces a silencing effect.

In addition, a silencer for a composite nozzle is already known made up of blades distributed around the periphery of the divergent section downstream of the outlet orifice of the primary nozzle and retracted into the fairing in the inactive position. In the active position, the upstream end of the blades penetrates into the primary jet, and the hot gases it bleeds off from within this jet are discharged into the secondary flow.

In accordance with the present invention, scoops bleed off, from downstream of the primary nozzle, certain portions of the hot jet and certain portions of the secondary flow, and discharge these into the ambient atmosphere, upstream of the efflux orifice of the secondary divergent section, so forming fractional jets. Noise attenuation results on the one hand from the masking effect which the fractional jets produce on the central jet, and on the other hand from the acceleration in the mixing of the latter with ambient air as a consequence of the crenellated form given it by the scoops and of its power — reduced because of the bleeds.

The scoops may, in particular, have the form of simple blades, flat or curved up, appertaining the U-shaped blades, i.e. having a flat or curved base and side cheeks to form saucers, lobes or tubular ducts with a cylindrical or prismatic aspect. In the active position, they discharge the gases and air bled off through openings in the afterbody, and they are so configured as to be able to retract into or against this afterbody in the inactive position, so restoring the continuity of the wall of the divergent section.

In one embodiment, the scoops are tubular ducts which, when in the inactive position, re-establish at the same time the continuity of the wall of the divergent section and that of the streamlined outer wall of the afterbody. In a further embodiment, the continuity of the outer wall is reconstituted, in the inactive position of the scoops, by trap-doors, or preferably, by freely-pivoting flaps which open and close under the effect of pressures.

In a further embodiment adapted particularly to nozzles of the type called "downstream thrust-reverser" (i.e. comprising a couple of obstacles for reversing the jet, in the form of buckets hinged transversely at the rear of the afterbody), the scoops open through channels formed by tabs of "sawtooth" pattern pointing alternately to the inside and to the outside of the afterbody, the said channels having a configuration making it possible to admit tertiary air for off design conditions. In a preferred solution, the tabs forming the base of the channels are fitted with blades which improve the supply of tertiary air to the nozzle for off design flight conditions (subsonic flights for example) and also improving the operation of the jet when reversed by obtaining an increase in the amount of back-thrust and a possibility of deflecting the reversed jet to one side so as to avoid its reingestion inside the nozzle.

The following description relating to the accompanying drawings and given by way of non-limitative example will bring out how the invention may be put into effect, features emerging both from the text and the drawings naturally forming part of the said invention.

FIG. 1 is a view in a diagrammatic axial half-section of a composite nozzle fitted with a silencer according to the invention;

FIG. 2 is a diagrammatic view similar to FIG. 1 and illustrating a further embodiment;

FIG. 5 is a cross-sectional view taken along the line V—V in FIG. 3 and illustrating diagrammatically the shape of the central jet and of the fractional jets disposed to act as silencers;

FIG. 6 is a view similar to FIGS. 1 and 2, showing a composite nozzle which includes at the rear some pivotal parts in the form of buckets and fitted with a silencer according to the invention;

FIG. 6a is a fractional view in perspective of the nozzle shown in FIG. 6;

FIG. 6b is a fractional view similar to FIG. 6, showing a modification to the control device for the scoops;

FIG. 7 is a view similar to FIG. 6, showing a further embodiment of the silencer;

FIG. 7a is a view in perspective of a silencer-associated scoop as shown in FIG. 7;

FIG. 8 is a view of a half cross-section, similar to that in FIG. 5, showing a modification of the nozzle in FIG. 6;

FIG. 9 is a fractional view similar to FIG. 6, and showing a variation;

FIG. 10 is a fractional axial section of diagrammatic type taken along the line IX—IX in FIG. 9.

Figure 3:
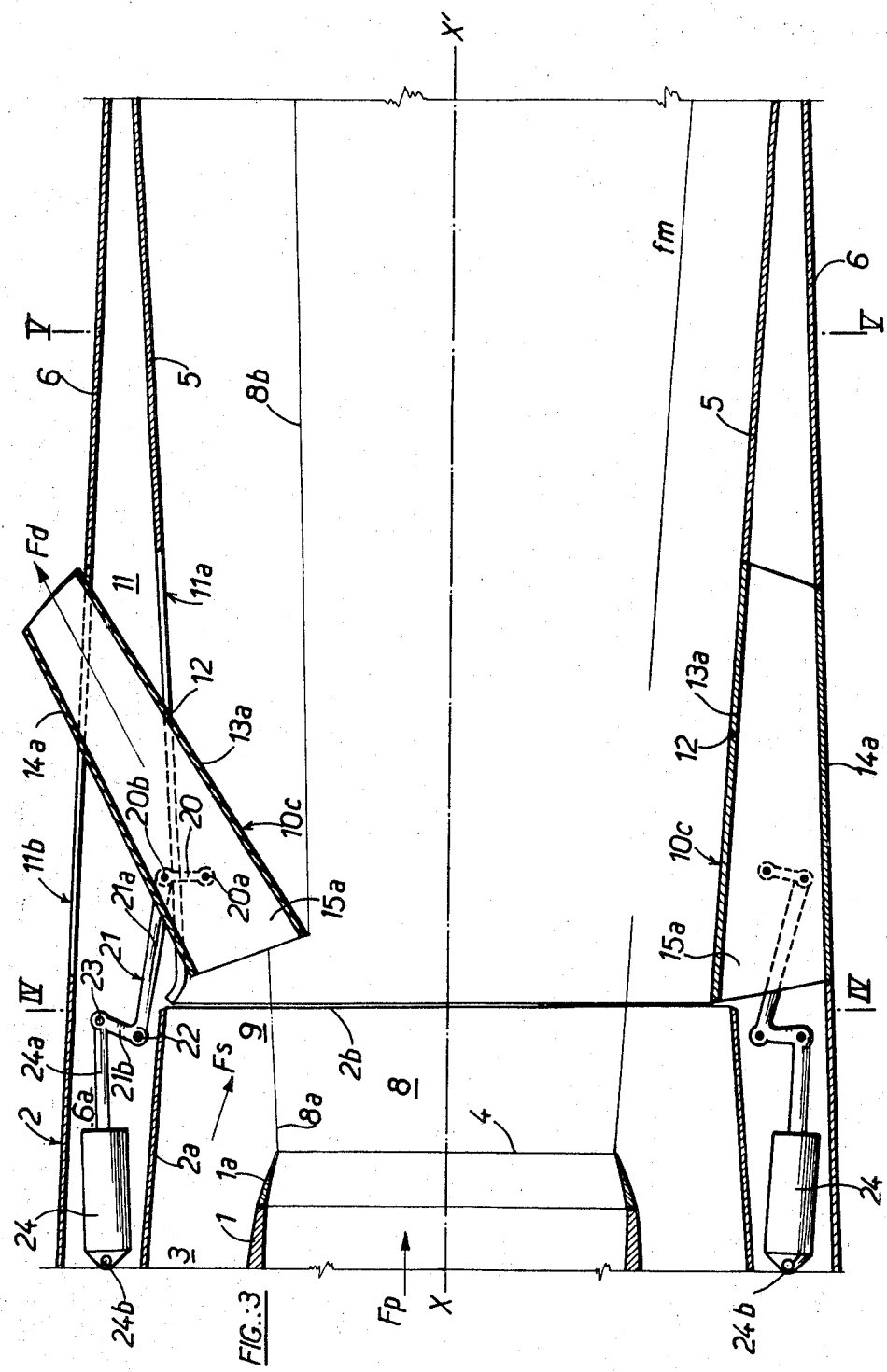
FIG. 3 is an axial-section view along the line III—III in FIG. 4, showing in greater detail a silencer similar to that in FIG. 1, this being when viewed in the active position in the upper half of the drawing and in the inactive position in the lower half.

FIGS. 1 and 2 illustrate in a highly diagrammatical manner two embodiments of the invention. At 1 will be seen a primary nozzle traversed by a flow of hot gases diagrammatically indicated by an arrow $F_p$, and a secondary fairing 2 surrounding the primary nozzle and delimiting around the latter an annular space 3 traversed by a stream of secondary air diagrammatically indicated by an arrow Fs. The secondary fairing 2 is extended to the rear of the efflux orifice 4 of the primary nozzle by an afterbody or rear unit which on the inside forms the immobile part of a divergent section 5 and on the outside a suitably streamlined surface 6; terminal flaps or petals 7 make it possible to adjust the outlet cross-section of the divergent section. The hot gases exiting from the primary nozzle 1 form, at the exit of the efflux orifice 4, a jet 8 the profile of which is indicated diagrammatically at 8a, the jet being surrounded by an annular secondary flow 9 supplied with secondary air exiting from the annular space 3.

The silencer according to the invention comprises a plurality of scoops which are denoted by the reference numeral 10 flagged by an index-letter, the scoops being housed in cavities 11 likewise distributed angularly within the fairing 2 downstream of the orifice of the primary nozzle. Each of the said scoops is mounted to pivot about a transverse axis 12, and means (not shown here) are provided to cause all the scoops to pivot simultaneously between an inactive position indicated here in unbroken lines and an active position indicated in chain-dotted lines.

In FIG. 1, the scoops 10a are tubular ducts with a closed straight section of rectangular aspect, and they are open at both ends. In the inactive position their inner walls 13 and their outer walls 14 reconstitute the continuity of the divergent section 5 and that of the streamlined external surface 6 of the fairing respectively. When they are in the active position, the scoops 10a snatch a portion of the primary jet 8 and a portion of the secondary flow 9, and despatch them to the outside of the nozzle, as has been indicated diagrammatically by the arrow Fd, this being to form around the nozzle a plurality of fractional jets indicated diagrammatically at j.

In FIG. 2, the scoops 10b have a U-shaped profile open to the outside, i.e. they comprise merely one inner wall 13 which in the inactive position reconstitutes the continuity of the surface of the divergent section 5, and two side walls 15. The outer wall 6 of the fairing continues at 16 over a portion of the length of the cavities 11, leaving openings 17 which are blocked off, when the scoops 10b are in the inactive position, by flaps 18 pivotally mounted at 18a about transverse axes to the rear of the portions of wall 16. The said flaps 18 may pivot freely in such a way that the pressure of the outer air flowing along the wall 6 keeps them closed (a position indicated in unbroken lines) when the scoops 10b are in the inactive position. When the said scoops are in the active position, they bleed off a fraction of the jet 8, something which brings about overpressure in the cavities 11, this overpressure causing the opening of the flaps 18, thus freeing the apertures 17 so as to allow the travel of the downstream ends of the scoops.

The gases bled off by their upstream ends and a fraction of the primary air, as they thus flow out inside the scoops following the arrow Fd, keep the flaps 18 in the position shown in chain-dotted lines, so that the fractional jets j may escape freely. It is self-evident that the scope of the invention would not be overstepped by providing a positive control of the pivotal movement of the flaps 18, either by urging them down by means of springs or by synchronizing their movement with that of the scoops.

Figure 4:
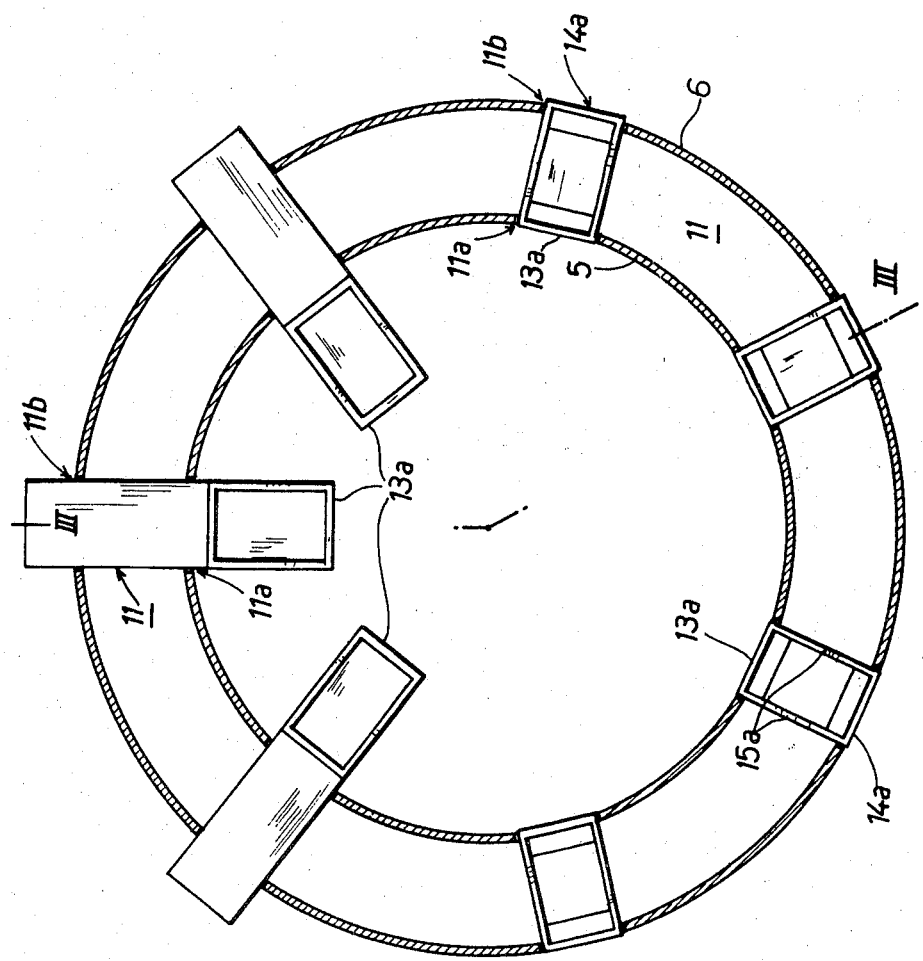
FIG. 4 is a cross-sectional view taken along line IV—IV in FIG. 3, the control mechanism not being illustrated.

FIGS. 3, 4 and 5 illustrate in greater detail the arrangement and operation of a silencer in accordance with the embodiment which has been described in relation to FIG. 1, the parts which fulfill the same function as in the said FIG. 1 being denoted by the same reference numerals. The composite nozzle shown in the said Figures is located to the rear of an engine positioned in a nacelle or in the pod of an aircraft (not shown here). The primary nozzle 1, fitted with adjustable flaps 1a, is connected to a portion (not shown) of the engine which it is appropriate to call a gas generator, and which during operation supplies the flow Fp of hot gas. The fairing 2 forms an afterbody which extends the nacelle or pod (not shown here) surrounding the engine and which on the inside constitutes a convergent section 2a followed by the divergent section 5, separated from each other by a throat 2b to collect the propulsive jet formed by the primary jet 8 and the secondary jet 9 intermingle inside the afterbody 2, downstream of the primary nozzle 1, following an average contact surface indicated diagrammatically at fm.

Downstream of the collecting throat 2b there are arranged (in the drawing provided here this constituting a non-limitative illustration) seven cavities 11 equally distributed angularly around the circumference of the afterbody 2 and causing the inside of the divergent section to communicate with the outside by way of rectangular openings 11a and 11b made in the inner wall forming the divergent section 5 and in the outer wall 6 respectively. The tubular scoops 10c are inserted in the said cavities 11 inside the afterbody. They have the shape of ducts with a virtually rectangular cross-section and are open at both ends; they are bounded by an inner wall 13a, an outer wall 14a and two side cheeks 15a. The said scoops are pivotally mounted, at a right angle to their inner walls 13a, about axes 12 which are tangential to a circle with its center at the axis XX' of the nozzle, at the intersection of a plane (perpendicular to the said axis) and of the wall of the divergent section 5. In another embodiment (not shown here), the axes 12 are located in the vicinity of this intersection.

As is also shown in FIG. 1, the surfaces 13a and 14a of the scoops in their inactive position (see the lower part of FIGS. 3 and 4) reconstitute the wall of the divergent section 5 and of the outer wall 6 of the afterbody respectively. In the active position (see the upper part of FIGS. 3 and 4), the upstream ends of the scoops 10c open into the divergent section, and their downstream ends extend out to the exterior. The upstream ends fit sufficiently far down into the divergent section to overstep the average boundary 8a of the primary jet 8, from which a portion is scooped away along with a portion of the secondary flow 9, the gases bled off in this manner traversing the scoops along Fd and emerging at their downstream end to the outside of the afterbody. The remaining part of the primary jet, comprising substantially that portion of the primary jet that is included inside a surface of revolution 8b supported on the forward margin of the walls 13a, and the portions located outside the said surface and included between the side cheeks of the adjacent scoops, is not deflected and follows the normal path to the exit of the divergent section so as to provide the propulsive force for the aircraft.

FIG. 5 illustrates the modifications made by the silencer to the configuration of the jet emitted by the divergent section. Upright to each of the seven scoops 10c in the active position, the bleed-off of gases brings about lowered pressure at the surface of the jet, and seven fractional jets j are emitted around the afterbody. The result is, on the one hand, a crenellation 19 of the surface of the propulsive jet, which increases its contact surface with the ambient air and consequently accelerates the mixing of the jet with the air, and on the other hand a decrease in the acoustic strength of the residual jet as a consequence of the decrease in its cross-section. These two effects cooperate to attenuate the noise, with the masking effect produced by the fractional jets j, which are moreover speedily diluted to the rear of the composite nozzle.

In the embodiment shown here, the pivoting movement of the scoops 10c between the inactive position and the active position, and vice versa, is controlled by an arrangement of actuators or jacks which is housed in the afterbody (see FIG. 3). Each of the side cheeks 15a of each scoop 10c is provided on its outer surface with a pivot 20a to which there is hinged one end of a small rod 20 the other end of which is hinged at 20b to one arm 21a of a bell-crank lever 21. The two bell-crank levers 21, pivotally attached thus on either side of the two side cheeks of a given scoop 10c, are pivotally mounted on the afterbody about a pivotal axis 22 parallel to the pivotal axis 12 of the said scoop, and their other arms 21b are connected, so as to be pivotal about an axis 23 parallel to the axes 22 and 12, to the rod 24a of an actuator 24 the cylinder of which is pivotably mounted on the afterbody about an axis 24b parallel to the axes 23, 22 and 12. Means not shown here are provided to supply fluid to all the actuators 24 simultaneously so as to cause all the scoops 10c to pivot simultaneously between the inactive position (shown in the lower part of the drawing) and the active position (shown in the upper part), and vice versa.

In certain installation arrangements it is not possible to have fractional jets such as those at j emitted over the whole periphery of the afterbody, either because of the external conformation of the airframe, which may well include, for example, control surfaces the proper operation of which would be impaired by the fractional jets, or because of the pairing-up of a plurality of engines side by side. In the case of two paired-up engines, it will be sufficient, for example, to modify the arrangement of FIGS. 3 to 5 by suppressing in each of the nozzles the scoops which are closest to the intermediate areas of the said two nozzles, so that the silencer of each engine will, for example, emit five fractional jets instead of seven. The scoops thus suppressed could well be replaced by silencer members of another type, for example by blades which scoop away portions of the primary flow for discharge into the secondary flow.

It is self-evident that there would be no overstepping of the scope of the invention by treating individually each of the fractional jets j to decrease its noise emission, for example by means of members of known type which break up the fractional jets and/or introduce into them air taken from outside.

FIGS. 6 to 10 illustrate the application of the invention to a composite nozzle already known under the designation of "downstream thrust-reverser nozzle," nowadays denoted (in France) by the abbreviation "-TRA." This nozzle is provided with two parts 25 symmetrically disposed in relation to the axis XX' of the nozzle and pivotally mounted to the rear of the afterbody 2, the pivoting being respectively about two pivot axes 26 and 27 parallel to each other and perpendicular to the axis XX'. Each of the parts 25 adapts to the configuration of the rear edge of the afterbody and comprises, in the embodiment shown here, a main part 25a forming a kind of bucket, and two lateral parts 25b which are hinged at the pivotal axis 26 or 27. When in the attitude for supersonic flight (shown in unbroken lines), the parts 25 extend the divergent section; in the take-off attitude (shown in chain-dotted lines) they are caused to pivot slightly to the rear so as to free two openings in the form of lunules 28 (see FIG. 8). In the transsonic flight configuration the parts 25 occupy an intermediate position between those shown respectively in unbroken and in chain-dotted lines. To obtain jet reversal, the parts 25 are swung over completely to the rear so that their trailing edges contact, and they thus form obstacles which effect reversal.

In FIGS. 6 to 8, the parts fulfilling the same role as in the preceding Figures are denoted by the same reference numerals. The rear end of the outer wall of the afterbody 2 has a saw-tooth arrangement which alternately comprises straight portions 29 (the outer surface 29a of which, in the embodiment shown here, extends the outer surface 6 up to the rear edge 30) and portions 31 inclined towards the interior of the nozzle. The rear edges 30a of these inclined parts 31, which are located in an identical transverse plane with the rear edge 30 but over a circle with a smaller diameter, are connected to the collecting throat 2b by means of inner walls 31b the inner surfaces of which form the divergent section 5. The straight parts 29 are each connected by two triangular cheeks 29b to an inclined inner wall 29c which joins the throat 2b to the rear edge 30. Each straight part 29 of the exterior wall of the afterbody thus forms along with its cheeks 29b and the corresponding inner wall 29c a triangular tab the general direction of which is turned towards the exterior of the afterbody. Each of the said tabs defines, between the two adjacent inclined portions 31, one of the cavities 11 in or against which a scoop will come to rest in the inactive position. The inclined parts 31 define, between the cheeks 29b of the adjacent tabs, crenellations through which tertiary air, bled from the outer flow, is able to enter the interior of the nozzle, i.e. between the parts 25 when in the attitude for take-off (FIG. 6a).

In other words, the opening 11 into which or against which the scoops will come to rest in the inactive position and through which they will discharge the hot gases and secondary air bled off in the active position, constitute channels made in a scarfed formation, from the inside towards the outside within the afterbody and starting from the collecting throat 2b so as to reach the rear edge 30 of the streamlined outer surface 6. The said channels 11 open through lunule-shaped orifices 28. The inclined parts 31 included between two adjacent channels 11 form crenellations for the entry of tertiary air. The said crenellations are made in scarfed formation from the outside towards the inside, their ends 31a starting at the streamlined outside surface 6 so as to terminate at the rear edge 30a of the inner surface of the afterbody which forms the divergent section 5.

In FIG. 6, the scoops 10d are simple blades each of which is housed in a cavity 11 located between two adjacent inclined parts 31 and is hinged at its rear edge about an axis 12 supported by these two adjacent parts 31. In the embodiment shown here, the forward end of the blades 10d is bent up so as to be applied in the inactive position (drawn in unbroken lines) against the convergent section 2a of the secondary nozzle, each blade 10d thus forming a break opposite to the collecting throat. In this position the body of the blades 10d is positioned flush with the inner walls 31b of the parts 31 and thus block the cavities 11 while restoring the surface of the divergent section.

The blades 10d are set to the active position when the parts 25 are in the take-off position. In this position (shown in chain-dotted lines) the front end of the blades penetrates the primary jet 8 in such a way as to scoop out some portions of the latter and some portions of the secondary jet 9, and as to discharge them to the exterior via the cavities 11, as is indicated by the arrows fd, in order thus to form around the nozzle the fractional jets j (see FIG. 8).

In the embodiment illustrated in FIG. 6, each blade 10d is controlled by an actuator 32 housed in the afterbody. The said actuator 32 is hinged to the afterbody about a pivotal axis 32a parallel to the axis 12, and its rod 32b is hinged by an axis 32c to a lever 33 integral with the blade 10d and substantially perpendicular to the latter. As a modification, each blade 10d might be provided with two levers, such as those at 33, fixed to its lateral edges and connected by an axis such as that at 32a to the center of which the rod 32b of the actuator would be attached. As in the embodiment in FIG. 3, all the actuators are controlled simultaneously by means not shown here so as to cause all the blades 10d to pivot simultaneously. In the embodiment in FIG. 6b, the levers 33 of the blades 10a are hinged at 33a to small rods 34 which themselves are pivotally attached to a ring 35 able to slide longitudinally along a guideway 35a. The sliding motion of this ring is controlled by actuators 36 pivotally attached at 36a to the afterbody, and the rods 36b of which are pivotally attached to the ring. The control system may thus include fewer actuators and the synchronizing of the movement of the blades is brought about more reliably.

The embodiment in FIGS. 7 and 7a differs from that in FIGS. 6 and 6a merely by the fact that the blades 10d are replaced by scoops 10e with a U-shaped cross-section as in FIG. 2, comprising an inner wall 13e and two side walls 15e. In the active position (indicated in chain-dotted lines in FIG. 7), the scoops 10e form along with the cavities 11 ducts for the hot gases and air bled off and now escaping at Fd, and the tertiary air is able to penetrate to the interior of the parts 25 by way of the lunule 28 (see FIG. 8), as is shown at Ft in FIG. 6a. In the inactive position, the walls 13e reconstitute the divergent section, and their front ends are applied against the secondary convergent section 2a as shown in FIG. 6, while the side walls 15e engage in grooves (not shown here) made with this in view inside the cavities 11.

As will be seen in FIG. 8, the openings in the form of lunules 28 uncovered by the parts 25 in the reversed-thrust position are of a width which decreases progressively as they approach the pivotal axes 26 and 27. The scoops in FIGS. 6 and 7 therefore run the risk of being partly obstructed opposite parts of the said opening 28 that are not of sufficient width to allow the exit at Fd of the hot gases and of the air bled off, i.e. in the vicinity of the pivotal axes 26 and 27 of the buckets 25. It will therefore prove advantageous not to position any scoop in the vicinity of the pivotal axes 26 and 27. It is clearly always possible to combine the silencer formed by the scoops such as those at 10d or 10e with a silencer of another type, one which does not produce any fractional jet on the outside of the nozzle.

FIG. 8 shows by way of example a silencer comprising three scoops 10d in that portion of the nozzle periphery that is at some distance from the axes 26 and 27 and, in the portion of the periphery that is close to the said pivotal axes, other scoops 37 whose front end, in the active position, penetrates the primary jet in such a way as to bleed off the relevant portions and to discharge them into the secondary jet inside the nozzle, so forming fractional jets such as at J'.

In the embodiment of the nozzles illustrated in FIGS. 6 to 8, it is selfevident that arrangements should be made to reserve, between the rear end 30 of the tabs 29, 29b, 29c and the front edge of the obstacles or buckets 25 in the jet-reversing position, a space sufficient for the sheet-like streams of deflected jet fluid not to run the risk of impinging (even as regards their streaks furthest upstream) against the inclined inner walls 29c of the said tabs, walls which are almost orthogonal to the flow of these streams of deflected jet fluid; this would simultaneously bring about losses of reverse-thrust and undesirable local rises in temperature in the vicinity of the trailing edges 30. To avoid this drawback, it is possible either to set the hinged axes 26, 27 far enough back, or to offset the rear edge 30 slightly upstream with reference to the rear edge 30a.

It is also possible, in a preferred embodiment, to provide in the tabs 29, 29b, 29c (volumes defined by the walls 29a and 29c between the triangular side cheeks 29b) passages which facilitate the admission of tertiary air to the lunules 28 in respect of flight conditions other than that at cruise-speed, in fact more especially in subsonic flight and take-off (a position of the buckets indicated in chain-dotted lines in FIG. 6), and also facilitating the flow of the deflected jet in the position providing jet reversal. This admission of tertiary air and this flow of deflected jet fluid is facilitated further by equipping the passages with guide-vanes which are preferably more or less deflected laterally to impart to the reversed jet fluid a degree of lateral deflection which eases the solution of the problems of reingestion of gas from the deflected jet into the nozzle. One embodiment of this latter arrangement is shown in FIG. 9, wherein the tabs 29, 29b, 29c are traversed by passages 38 fitted with blades 38a, 38b, 38c, 38d the span of which is inclined by an angle α to the direction of the nozzle axis in such a way as to impart to the stream of deflected gases which pass between the vanes from the rear towards the front, and from the interior towards the exterior of the afterbody, a component which is tangential in relation to the latter.

It is appropriate to note that these vanes, if they are set sufficiently tightly together, do not produce any significant drag when flying at cruise speeds. On the contrary, they produce an advantageous effect:

in off design flight conditions (during take-off and subsonic flight, for example) by facilitating the supply of tertiary air to the lunules 28, as has been shown diagrammatically by the arrow 1 in FIG. 10;

and in the reversed jet position by increasing the amount of reverse-thrust by virtue of ejection along the arrow m of a portion of the reversed jet and by supplying a means for the lateral control of the deflected flow in order to avoid the risk of partial reingestion of the deflected jet into the nozzle.

What is claimed is:

1. A silencer or muffler device for a jet engine nozzle efflux system, of the type which includes a primary nozzle which emits into the divergent section of a secondary nozzle, formed by the inner wall of an afterbody with a streamlined outer wall, a primary jet of hot gases surrounded by a flow of secondary air; said device comprising a plurality of scoop-like members adapted to be moved between an active position in which they penetrate into the jet, as regards their upstream end, in the manner of scoops so as to bleed off portions of the jet of hot gases and of the flow of secondary air and discharge them into the ambient atmosphere upstream of the exit of the divergent section by way of openings in the afterbody, so forming fractional jets around the central jet which is formed by the non-bled portion of the primary jet and of the secondary flow, and an inactive position in which they fit into the said openings and reconstitute the continuity of the wall of the divergent section.

2. A device as claimed in claim 1, in which said scoop-like members comprise tubular members with a closed configuration which, in the inactive position, also reconstitute the continuity of the streamlined outer wall of the afterbody.

3. A device as claimed in claim 1, in which the opening of said apertures into said afterbody outer wall is provided with pivoting flaps which are normally closed and complement the said outer wall and which are adapted to open under the effect of the pressure of fluid discharged by said scoop-like members in the active position.

4. A device as claimed in claim 1, said device being for a nozzle of the type which at the rear comprises pivoting parts in the form of buckets which in normal flight are applied to the rear of the afterbody and move away therefrom at take-off, so opening orifices in the shape of lunules, in which said scoop-like members are housed in their inactive position in or against channels in the afterbody which open to the said lunule-shaped orifices.

5. A device as claimed in claim 4, in which the channels are made in a scarfed formation, running from the inside towards the outside, in the afterbody and terminate at the rear edge of the streamlined outer surface of the latter.

6. A silencer as claimed in claim 5, in which the channels start from a throat which separates the divergent section from a convergent section formed upstream by the inner surface of the afterbody, and the inner walls forming the base of said scoop-like members have a curved-up upstream portion so as to apply itself against the convergent section in the inactive position.

7. A device as claimed in claim 4, in which said scoop-like members include cheeks or side walls which in the inactive position fit into grooves in the channels.

8. An efflux system provided with a silencer or muffler device as claimed in claim 5, in which portions of the afterbody included between two adjacent channels are provided with crenellations for the entry of tertiary air and made in a scarfed formation from the outside towards the inside, the base of which starts from the streamlined outer surface of the afterbody so as to terminate at the rear edge of the inner surface of the latter, which forms the divergent section.

9. An efflux device provided with a silencer or muffler device as claimed in claim 4, in which the bases of the channels in which said scoop-like members are housed are formed by portions of the afterbody in the shape of tabs traversed by passages having port on the outside.

10. An efflux device as claimed in claim 9, in which said passages are equipped with guide-vanes which are so shaped as to impart to a gaseous stream flowing between them from the rear to the front and from the inside towards the outside of the afterbody a component which is tangential in relation to the latter.

* * * * *